US009698965B2

(12) United States Patent
Koskinen et al.

(10) Patent No.: US 9,698,965 B2
(45) Date of Patent: Jul. 4, 2017

(54) METHOD AND APPARATUS FOR AVOIDING INTERFERENCE BETWEEN MULTIPLE RADIOS IN A USER EQUIPMENT

(75) Inventors: Henri Markus Koskinen, Espoo (FI); Jussi Kustaa Ojala, Helsinki (FI); Antti-Veikko Piipponen, Vantaa (FI); Tommi Juhani Zetterman, Espoo (FI)

(73) Assignee: Nokia Technologies Oy, Espoo (FI)

( * ) Notice: Subject to any disclaimer, the term of this patent is extended or adjusted under 35 U.S.C. 154(b) by 94 days.

(21) Appl. No.: 13/877,683

(22) PCT Filed: Sep. 30, 2011

(86) PCT No.: PCT/IB2011/054316
§ 371 (c)(1),
(2), (4) Date: May 21, 2013

(87) PCT Pub. No.: WO2012/046172
PCT Pub. Date: Apr. 12, 2012

(65) Prior Publication Data
US 2013/0229952 A1    Sep. 5, 2013

Related U.S. Application Data

(60) Provisional application No. 61/389,416, filed on Oct. 4, 2010.

(51) Int. Cl.
*H04B 15/00* (2006.01)
*H04J 1/00* (2006.01)
(Continued)

(52) U.S. Cl.
CPC .............. *H04L 5/1453* (2013.01); *H04L 5/16* (2013.01); *H04W 72/0453* (2013.01)

(58) Field of Classification Search
USPC .......................................... 370/278
See application file for complete search history.

(56) References Cited

U.S. PATENT DOCUMENTS

2008/0279137 A1    11/2008    Pernu et al.
2009/0209257 A1    8/2009    Brunel et al.
(Continued)

FOREIGN PATENT DOCUMENTS

CN    101511114 A    8/2009
CN    101682933      3/2010
(Continued)

OTHER PUBLICATIONS

*New Study Item Proposal: Signalling and Procedure for In-device Coexistence Interference Avoidance*; 3GPP TSG RAN #48 (RP-100671).
(Continued)

*Primary Examiner* — Edan Orgad
*Assistant Examiner* — Sithu Ko
(74) *Attorney, Agent, or Firm* — Alston & Bird LLP

(57) ABSTRACT

In accordance with an example embodiment of the present invention, an apparatus, comprising at least one processor; and at least one memory including computer program code; the at least one memory and the computer program code configured to, with the at least one processor, cause the apparatus to perform at least the following: deciding to switch to a half-duplex mode of operations upon detecting a triggering condition including that multiple radio stacks are activated at the apparatus simultaneously; signaling an associated base station the decision of switching to the half-duplex mode half-duplex mode; and entering the half-duplex mode of operation, is disclosed.

18 Claims, 5 Drawing Sheets

(51) Int. Cl.
*H04L 5/14* (2006.01)
*H04L 5/16* (2006.01)
*H04W 72/04* (2009.01)

(56) References Cited

U.S. PATENT DOCUMENTS

2009/0296609 A1* 12/2009 Choi .................. H04W 72/121
370/281
2012/0207040 A1* 8/2012 Comsa .............. H04W 72/1215
370/252

FOREIGN PATENT DOCUMENTS

| WO | WO-2006/106378 A1 | 10/2006 |
| WO | WO-2008/127993 A1 | 10/2008 |
| WO | WO 2008/139336 A1 | 11/2008 |
| WO | WO-2009/055714 A2 | 4/2009 |

OTHER PUBLICATIONS

*A SAW-less Multiband Wedge Receiver*, ISSCC, 6.2 (2009) 3 pages.
International Search Report for Application No. PCT/IB2011/054316, dated Jan. 16, 2012.
Office Action for Chinese Application No. 201180044587.0 dated Jul. 13, 2016.
Office Action for corresponding Chinese Application No. 201180044587.0 dated Jan. 22, 2016.
International Written Opinion for corresponding International Application No. PCT/IB2011/054316, dated Jan. 16, 2012.
Office Action for Chinese Application No. 201180044587.0 dated May 12, 2015.
Office Action for Chinese Application No. 201180044587.0 dated Dec. 15, 2016.

* cited by examiner

METHOD AND APPARATUS FOR AVOIDING INTERFERENCE BETWEEN MULTIPLE RADIOS IN A USER EQUIPMENT

TECHNICAL FIELD

The present application relates generally to an apparatus and a method for avoiding interference between multiple radios in a user equipment.

BACKGROUND

A half-duplex system provides for communication in both directions, but only one direction at a time (not simultaneously). Typically, once a party begins receiving a signal, it must wait for the transmitter to stop transmitting, before replying. In automatically-run communications systems, such as two-way data-links, the time allocations for communications in a half-duplex system may be controlled by the hardware. Thus, there is no waste of the channel for switching. For example, one user equipment (UE) on one end of the wireless link could be allowed to transmit for one second, and then another UE on the other end could be allowed to transmit for one second.

It is not uncommon that new generation of user equipment supports multiple radio stacks that may be activated simultaneously to support multiple services on different radio technologies. A radio stack may include radio specific hardware and protocol software to enable the user equipment to operate on a particular frequency. Multiple radio stacks operating on frequencies related in a certain way may create intermodulation interference to each other.

SUMMARY

Various aspects of the invention are set out in the claims.

In accordance with an example embodiment of the present invention, a method.

In accordance with an example embodiment of the present invention, an apparatus.

In accordance with another example embodiment of the present invention, an system.

BRIEF DESCRIPTION OF DRAWINGS

For a more complete understanding of example embodiments of the present invention, reference is now made to the following descriptions taken in connection with the accompanying drawings in which.

DETAILED DESCRIPTION

Figure 1:
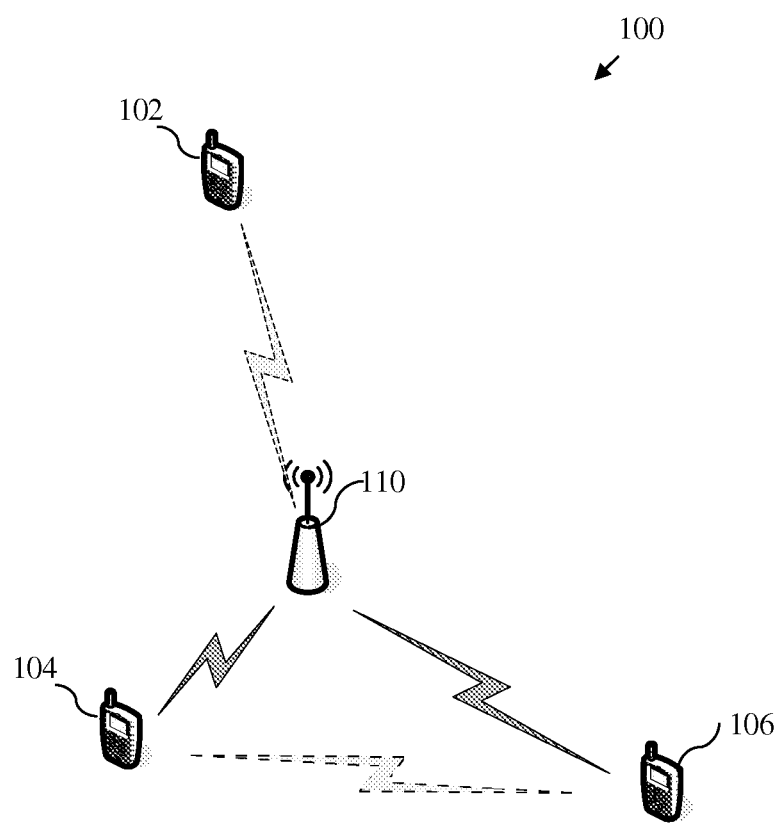
FIG. 1 illustrates an example wireless system in accordance with an example embodiment of the invention.

The invention is a mechanism for interference avoidance between cellular FDD radio and other collocated radios, whose transmitter used simultaneously with a cellular radio transmitter may introduce an intermodulation component to disturb the cellular reception (typically a third-order intermodulation component). For example, the industrial, scientific and medical (ISM) band radios (WLAN, Bluetooth) and LTE band VII are two radio stacks that may be collocated at a single user equipment. In wireless communication market, smart connected devices demand that the same device supports multiple radio technologies or radio stacks. These different radios may interfere each other and the devices may have to have some intelligent ways to handle this interference. Some of the interference can be handled internally in device, but for some situations some knowledge of network behavior would be needed. Solutions for some of the problems where RF filtering does not appear to sufficient are studied in 3GPP in "Signaling and procedure for in-device coexistence interference avoidance" Study item, see RP-100671. In this study item the work is mainly concentrating on LTE radio solutions when the other radio is either in ISM band (like BT or WLAN) or GPS in 1575.42 MHz.

The problem arises when two transmissions in different frequencies together creates unwanted behavior in third frequency in a receiver due to non-linear behavior in signal processing. This phenomenon is known and studied e.g. for WCDMA in paper "2009 IEEE International Solid-State Circuits Conference" in article "A SAW-Less Multiband WEDGE Receiver". It is likely that same problem will arise in LTE in some situations. One of these situations currently identified as a possible problem is in LTE band 7 and ISM band transmission. ISM and LTE transmissions together might cause problem for LTE reception due to the intermodulation problem. This may happen when the ISM band transmit signal is approximately at the duplex distance away from the LTE uplink, i.e. the frequency spacing between the ISM band transmit signal and the LTE uplink is the same as the spacing between LTE uplink and LTE downlink. The problem is known as shown in article and 3GPP specifies intermodulation tests for user equipment.

The problem here can be avoided if, whenever the terminal has both the radio technologies active on the problem-prone combination of frequency bands, the LTE network treats it as a half-duplex UE (even if it is not). At simplest, the invention requires no modification to current specifications, provided that in LTE cells operating on the problem-prone frequency the terminal identifies itself as half-duplex. This however may result in suboptimal performance (uplink and downlink throughput) for the terminal whenever the terminal has no radios other than LTE active. Enabling the terminal to dynamically signal its duplex-status according to whether or not half-duplex treatment by the network is needed, requires in the specifications a new signaling procedure (most likely RRC) initiated by the terminal, in which the terminal sends some form of indication to the network (could simply be the currently defined UECapabilityInformation message), and as a result of which the network starts or stops treating the terminal as half-duplex.

An example embodiment of the present invention and its potential advantages are best understood by referring to FIGS. 1 through 5 of the drawings, like numerals being used for like and corresponding parts of the various drawings.

FIG. 1 illustrates an example wireless system 100 in accordance with an example embodiment of the invention. The wireless system 100 includes a base station 110, and user equipments 102, 104 and 106. In one example embodiment, the UE 102 is connected to the base station 110 via a long term evolution (LTE) wireless connection and the UEs 104 and 104 are also connected to the base station 110 also via LTE connections. In addition, the UEs 104 and 106 are also connected to each other via a different radio technology such as a wireless local area network (WLAN) connection.

In one example embodiment, when the UEs 104 and 106 started communicating with each other via a WLAN link while still in connection with the base station 110 via a LTE link. In doing so, both the UEs 104 and 106 have two radio stacks, WLAN and LTE radio stacks activated. When the UEs 104 and 106 detect that a triggering condition is met, such as activation of multiple radio stacks, either one or both of the UEs 104 and 106 may decide to enter a half-duplex mode of operations to avoid the intermodulation interference. The UE 104 and 106 may send a signaling message to inform the associated base station 110 of the decision to switch to the half-duplex mode of operations. The UEs 104 and 106 may enter the half-duplex mode of operations by avoiding transmitting data and receiving data simultaneously. Upon receiving the signaling messages from the UEs 104 and 106, the base station 110 may mark the two UEs as in the half-duplex mode, perform adjustment to the resource allocation, and enter the half-duplex operations with the UEs 104 and 106. When a second triggering condition occurs, such as the UE 104 or the UE 106 deactivating one of the radio stacks, such as the WLAN connection, the UE 104 and 106 may decide to switch back to the full duplex mode of operation. The UEs 104 and 106 may send another signaling message to inform the base station 110 of the decision to switch back to the full duplex mode of operation. The base station 110, upon receiving the second signaling message, may adjust the resource allocations accordingly, and switch back to regular full duplex mode of operations. In one example embodiment, the wireless network 100 is a combination of a wireless local area network (WLAN) and a LTE access network. In such a combined network, the UE 102 through 106 may be LTE handsets or generic $4^{th}$-generation mobile stations configured to support multiple radio stacks including WLAN radio stack and LTE radio stack and the base station 110 may be a LTE node B.

Figure 2:
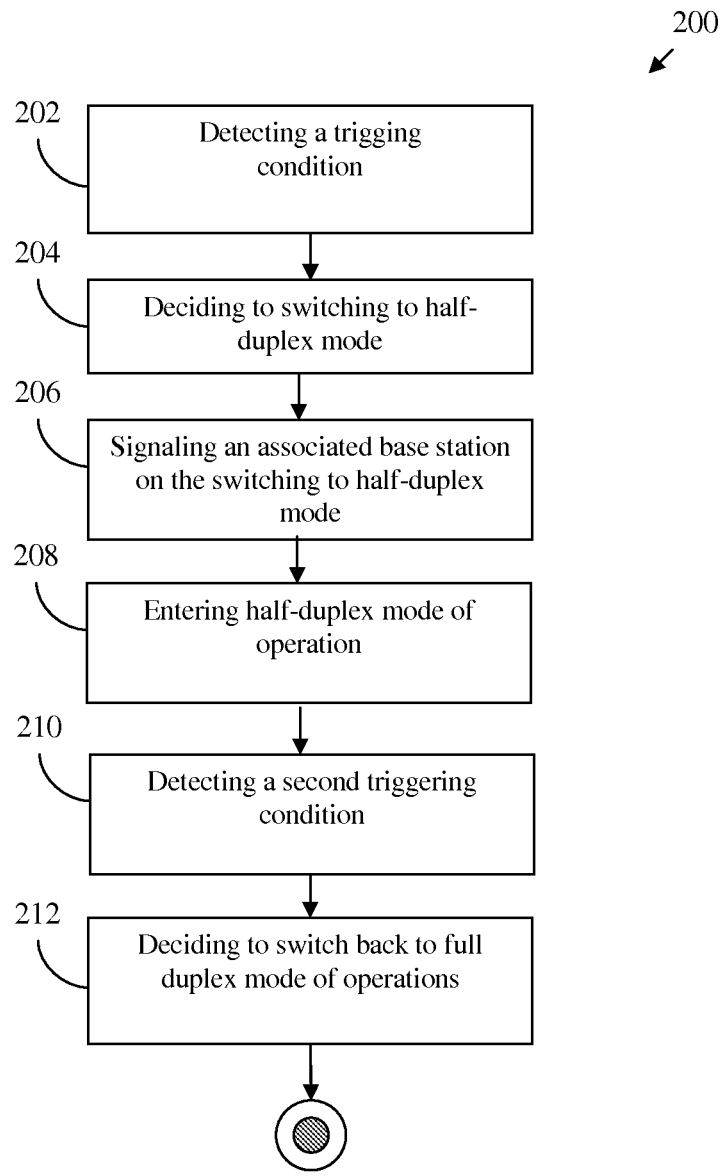
FIG. 2 illustrates an example method for avoiding interference at a user equipment in accordance with an example embodiment of the invention.

FIG. 2 illustrates an example method 200 for interference-aware wireless communications in accordance with an example embodiment of the invention. The method 200 includes detecting a triggering condition at block 202, deciding to switch to a half-duplex mode of operation at block 204, signaling the associated base station on the switch to the half-duplex mode of operations at block 206 and entering the half-duplex mode of operations at block 208. The method 200 may also include detecting a second triggering condition at block 210 and deciding to switch back to full duplex mode of operations at block 212.

In one example embodiment, detecting a triggering condition at block 202 may include detecting occurrences of one or more triggering events, combination of which may trigger the UE to enter the half-duplex mode of operation. Examples of the triggering events may include detecting that more than one radio stack are activated at the UE simultaneously, the radio stacks starting to use the interference-prone bands or frequency channels and a transmitting power of the UE reaching a threshold high level.

In one example embodiment, deciding to switch to the half-duplex mode of operation at block 204 may include taking into consideration other factors and making a decision to switch to the half-duplex mode of operations upon occurrence of the triggering condition. The examples of other factors to be considered may include resource constraint, customer service quality requirements and the type of services to be carried on the wireless link, and the like. In one example embodiment, signaling the associated base station on the switch to the half-duplex mode of operations at block 206 may include sending a radio resource control (RCC) message to the associated base station. In one example embodiment, the signaling message may comprise an indication of at least one pair of frequencies $f_1$ and $f_2$ in such a way that the base station knows that the UE needs to avoid receiving on one of the frequencies $f_1$ and $f_2$ and transmitting on the other frequency simultaneously.

In one example embodiment, entering the half-duplex mode of operations at block 208 may include avoiding transmitting to the base station on an uplink while receiving from the base station on a downlink simultaneously or avoiding receiving from the base station on a downlink while transmitting to the base station on an uplink simultaneously. In another example embodiment, while in idle state, the UE may remain in the half-duplex mode to avoid the overhead of switching between the half-duplex mode of operations and the full duplex mode of the operations.

In one example embodiment, detecting a second triggering condition at block 210 may include detecting one or more events that trigger a switch back to normal full duplex mode of operations. The examples of the triggering events may include the intermodulation interference decreasing to a low threshold, one or more of multiple radio stacks having been deactivated leaving at most one radio stack active, a less interference-prone band or frequency channel put in use in place of an interference-prone frequency band, and a transmitting power of the UE decreasing to a low threshold, and the like. In one example embodiment, switching back to full duplex mode of operations at block 212 may include sending another signaling message to inform the associated base station that the UE is switching to the full duplex mode of operations. Switching back to full duplex mode of operations at block 212 may also include entering the full duplex mode of operations, and transmitting and receiving data simultaneously when there is a need.

Figure 5:
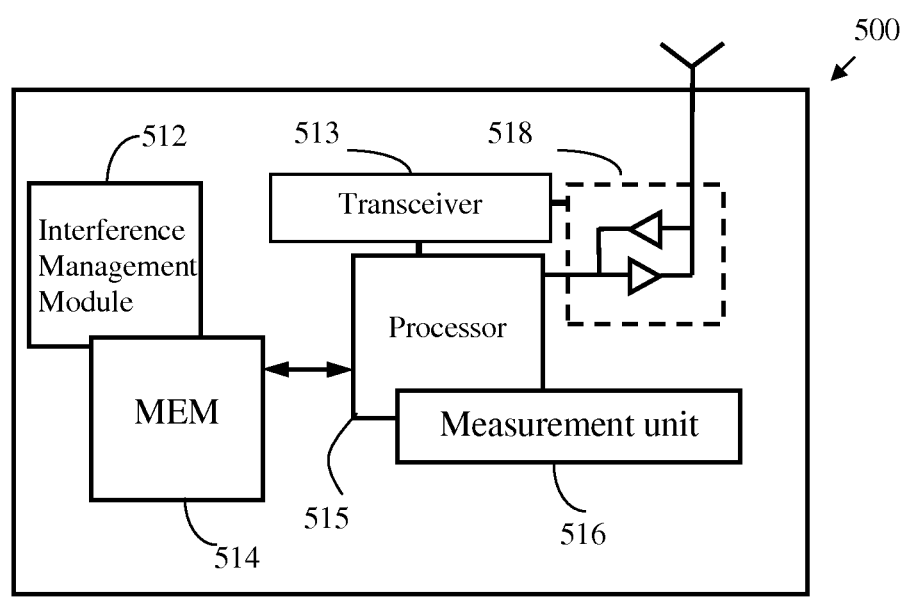
FIG. 5 illustrates an example wireless apparatus in accordance with an example embodiment of the invention.

In one example embodiment, the method 200 may be implemented at any of the UEs 102, 104 and 106 of FIG. 1 or the apparatus 500 of FIG. 5. The method 200 is for illustration only and the steps of the method 200 may be combined, divided, or executed in a different order than illustrated, without departing from the scope of the invention of this example embodiment.

Figure 3:
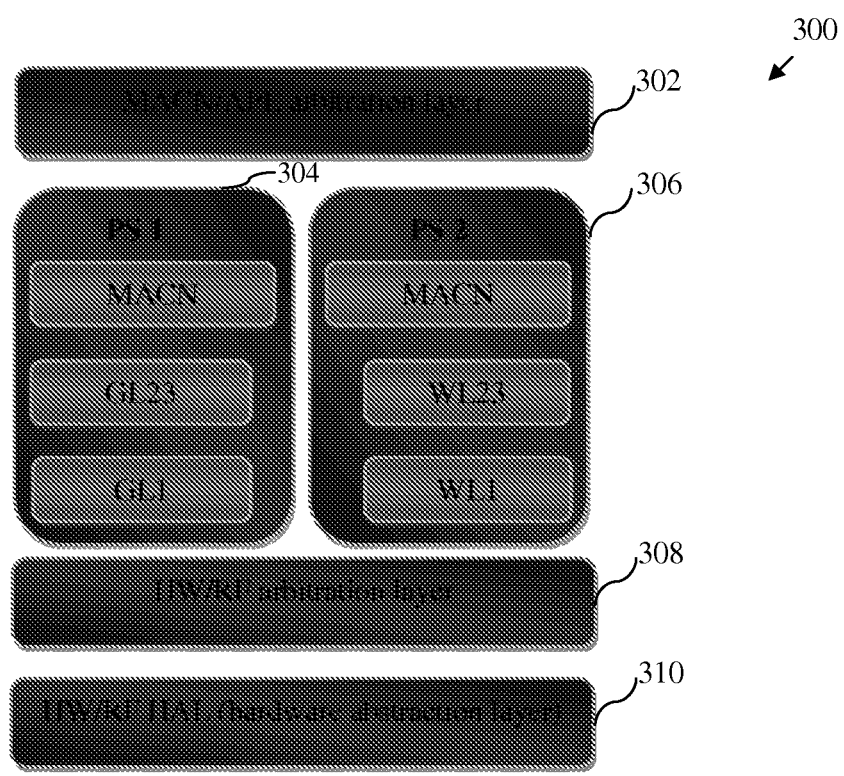
FIG. 3 illustrates a multiple radio stacks at a user equipment in accordance with an example embodiment of the invention.

FIG. 3 illustrates an example user equipment 300 with multiple radio stacks at a user equipment in accordance with an example embodiment of the invention. The UE 300 may include a multi-access core network (MACN)/APE arbitration layer 302, two radio stacks 304 and 306, a hardware/radio frequency arbitration layer 308 and a hardware for radio frequency abstraction layer (HAL) 310. The MACN arbitration layer 302 may be configured to mediate differences between different access network technologies. The protocol stack (PS) 304 and the PS 306 are configured to support two different radio stack and radio protocols. The PS 304 includes a MACN functionalities at network layer, LTE layer 2 and 3 (LL2/3) protocol support functionality and LTE layer 1 ; (LL1) support functionalities. The protocol stack 306 includes MACN support functionalities at network layer, a WLAN layer 2/3 (WL2/3) support function, and a WLAN layer 1(WL1) support function. The hardware and radio frequency arbitration layer 308 may be configured to mediate differences between radio stacks at hardware and radio frequency layer. The hardware and radio frequency abstraction layer 310 may be configured to represent the radio hardware in an abstraction. In one example embodiment, the two radio stacks, the GSM radio stack and WLAN radio stack may be activated simultaneously. When the UE enters the half-duplex mode of operation, the radio stacks PS 304 and PS306 may be active at the same time; however either of the radio stacks may not transmit or receive data at the same time.

Figure 4:
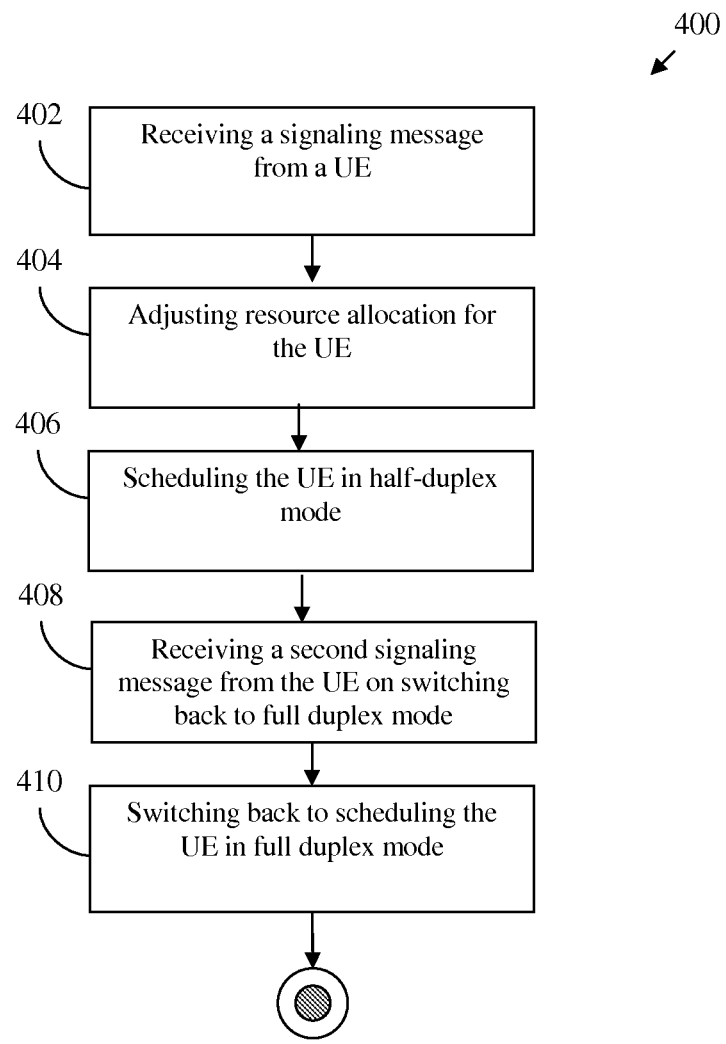
FIG. 4 illustrates an example method for a base station to help avoid interference at a user equipment in accordance with an example embodiment of the invention.

FIG. 4 illustrates an example method 400 for a base station to help avoid interference at a user equipment in accordance with an example embodiment of the invention. The method 400 includes receiving a signaling message from a UE at block 402, adjusting resource allocation for the UE at block 404 and scheduling the UE in half-duplex mode at block 406. The method 400 may also include receiving a second signaling message from the UE on switching back to the full duplex mode at block 408 and switching back to scheduling the UE in full duplex mode at block 410.

The discussion thus far has assumed that the UE has been configured to operate on only one of an uplink and a downlink such as an LTE uplink and an LTE downlink carrier. In the half-duplex mode of operation, the UE does not performs LTE transmission concurrently with LTE reception or vice versa. However, in case of carrier aggregation, the UE may at a given time be configured to operate on more than one uplink or downlink carriers. In such a case, it is sufficient to avoid concurrent operation only on each such pair of carriers that suffers from the described intermodulation problem, while the overall operation of the UE may not be strictly in half-duplex mode of operations, i.e. concurrent LTE transmission and reception on other, non-problematic carriers may still take place.

Accordingly, in one example embodiment, receiving a signaling message from a UE at block 402 may include receiving the signaling message from a UE that is configured with multiple radio stacks. The signaling message comprises one of a standard radio resource control (RRC) message or a generic signaling message and the signaling message may include among other information items an indication of at least one pair of frequencies $f_1$ and $f_2$ that require half-duplex operation at least with respect to those frequencies in such a way that the UE can avoid receiving on one of the frequencies $f_1$ and $f_2$ and transmitting on the other frequency simultaneously.

In one example embodiment, adjusting resource allocation for the UE at block 404 may include changing one or both of downlink and uplink resource allocation in response to the UE switching to the half-duplex mode. In one example embodiment, adjusting resource allocation may include de-allocating resource previously allocated for the full duplex mode of operations. In one example embodiment, entering the half-duplex mode of operations at block 406 may include avoiding sending data to the UE on a downlink while receiving data from the UE on an uplink simultaneously and avoiding requesting uplink transmission from the UE while sending data to the UE simultaneously.

In one example embodiment, receiving a second signaling message from the UE at block 408 may include receiving the second signaling message from a UE that previously has switched to the half-duplex mode of operations. The second signaling message may be a RRC message and may inform the base station that the UE has switched back to normal full-duplex mode of operations. In one example embodiment, switching back to the full duplex mode of operation at block 410 may include resuming the full duplex mode of operations, and re-allocating the radio resources accordingly.

FIG. 5 illustrates an example wireless apparatus in accordance with an example embodiment of the invention. In FIG. 5, the wireless apparatus 500 may include a processor 515, a memory 514 coupled to the processor 515, and a suitable transceiver 513 (having a transmitter (TX) and a receiver (RX)) coupled to the processor 515, coupled to an antenna unit 518. The memory 514 may store programs such as an interference management module 512. The wireless apparatus 500 may be at least part of a generic $4^{th}$ generation base station, or an LTE compatible base station.

The processor 515 or some other form of generic central processing unit (CPU) or special-purpose processor such as digital signal processor (DSP), may operate to control the various components of the wireless apparatus 500 in accordance with embedded software or firmware stored in memory 514 or stored in memory contained within the processor 515 itself. In addition to the embedded software or firmware, the processor 515 may execute other applications or application modules stored in the memory 514 or made available via wireless network communications. The application software may comprise a compiled set of machine-readable instructions that configures the processor 515 to provide the desired functionality, or the application software may be high-level software instructions to be processed by an interpreter or compiler to indirectly configure the processor 515.

In an example embodiment, the interference management module 512 at a user equipment may be configured to decide to switch to a half-duplex mode upon detecting a triggering condition include that an intermodulation interference reaching a threshold and send a signaling message to inform an associated base station of the decision of switching to the half-duplex mode. The interference management module 512 may also be configured to cause the UE to enter the half-duplex mode of operation The interference management module 512 may be configured to cause the UE to detect the triggering condition by detecting that more than one radio stack are activated at the UE simultaneously, the interference-prone bands or frequency channels are put in use by the activated radio stacks, transmitting power of the UE reaches a threshold level. The interference management module 512 may be also configured to cause the UE to switch back to a normal duplex mode upon detecting a second triggering condition. The second triggering condition may include one or more of the following events: an intermodulation interference decreases to a low threshold; one or more of multiple radio stacks are deactivated leaving at most one radio stack active; a less interference-prone band or frequency channel is put in use; and transmitting power of the UE decrease to a low threshold.

In one example embodiment, the transceiver 513 is for bidirectional wireless communications with another wireless device. The transceiver 513 may provide frequency shifting, converting received RF signals to baseband and converting baseband transmit signals to RF, for example. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. In some embodiments, the transceiver 513, portions of the antenna unit 518, and an analog baseband processing unit may be combined in one or more processing units and/or application specific integrated circuits (ASICs). Parts of the transceiver may be implemented in a field-programmable gate array (FPGA) or reprogrammable software-defined radio.

In an example embodiment, the antenna unit 518 may be provided to convert between wireless signals and electrical signals, enabling the wireless apparatus 500 to send and receive information from a cellular network or some other available wireless communications network or from a peer wireless device. In an embodiment, the antenna unit 518 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 518 may include antenna tuning and/or impedance matching components, RF power amplifiers, and/or low noise amplifiers.

As shown in FIG. 5, the wireless apparatus 500 may further include a measurement unit 516, which measures the signal strength level that is received from another wireless device, and compare the measurements with a configured threshold. The measurement unit may be utilized by the wireless apparatus 500 in conjunction with various exemplary embodiments of the invention, as described herein.

In general, the various exemplary embodiments of the wireless apparatus 500 may include, but are not limited to, part of a mobile station, an access point or a wireless device such as a portable computer having wireless communication capabilities, Internet appliances permitting wireless Internet access and browsing, as well as portable units or terminals that incorporate combinations of such functions. In one embodiment, the wireless apparatus 500 may be implemented in the UEs 102 through 106 of FIG. 1.

Without in any way limiting the scope, interpretation, or application of the claims appearing below, a technical effect is to avoid intermodulation interference for UEs configured with multiple radio stacks. At simplest, the invention requires no modification to current standard specifications, provided that in LTE cells operating on the problem-prone frequency, the UE identifies itself as being in the half-duplex mode of operations to the associated base station.

Embodiments of the present invention may be implemented in software, hardware, application logic or a combination of software, hardware and application logic. The software, application logic and/or hardware may reside on a mobile station, an access point, a user equipment or similar network device. If desired, part of the software, application logic and/or hardware may reside on access point, and part of the software, application logic and/or hardware may reside on a network element such as a mobile station or a base station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
at least one processor; and
at least one memory including computer program code;
the at least one memory and the computer program code configured to, with the at least one processor, cause the apparatus to perform at least the following:
deciding to switch to a half-duplex mode of operations upon detecting a first triggering condition associated with a first threshold including that an intermodulation interference reaches the first threshold and a transmitting power of the apparatus reaches a second threshold;
signaling an associated base station the decision of switching to the half-duplex mode;
entering the half-duplex mode of operation; and
upon detecting a second triggering condition with a second threshold level, causing the apparatus to switch back to a full duplex mode, wherein the second triggering condition comprises the intermodulation interference decreasing to a third threshold that is lower than the first threshold, and the transmitting power of the apparatus decreasing to a fourth threshold that is lower than the second threshold.

2. The apparatus of claim 1 wherein detecting the first triggering condition further comprise one or more of the following:
detecting that the intermodulation interference reaches the fourth threshold;
detecting the interference-prone bands or frequency channels are put in use by the activated radio stacks; and
detecting that at least one transmitting power of the radio stacks at the apparatus reaches a threshold level.

3. The apparatus of claim 1 wherein deciding to switching to the half-duplex mode of operation further comprise recognizing a need to, on at least one pair of carrier frequencies, avoid transmitting on one of the frequencies when receiving on the other.

4. The apparatus of claim 1 wherein signaling the associated base station further comprises sending to the base station a signaling message indicating at least one pair of frequencies $f_1$ and $f_2$ so that the apparatus avoids receiving on one of the frequencies $f_1$ and $f_2$ and transmitting on the other frequency simultaneously.

5. The apparatus of claim 1 wherein entering the half-duplex mode of operation comprise at least one of:
avoiding transmission to the base station on an uplink while receiving on a downlink from the base station simultaneously; and
avoiding receiving from the base station on the downlink while transmitting to the base station on the uplink simultaneously.

6. The apparatus of claim 1 wherein entering operations in the half-duplex mode comprise staying in the half-duplex mode while in an idle state.

7. The apparatus of claim 1 wherein detecting the second triggering condition comprises at least one of:
detecting that an intermodulation interference decreases to the fourth threshold;

detecting that one or more of multiple radio stacks are deactivated leaving at most one radio stack active;

detecting a less interference-prone band or frequency channel is put in use; and detecting that at least one transmitting power of the radio stacks at the apparatus decrease to a threshold.

8. The apparatus of claim 7, wherein the apparatus is one of a long term evolution (LTE) handset and a generic $4^{th}$-generation mobile station configured to support multiple radio stacks including a wireless local area network (WLAN) radio stack and a LTE radio stack.

9. A method, comprising:

receiving at a base station a first signaling message from a user equipment (UE), in response to detection of a first triggering condition, comprising an indication of a need to switch to a half-duplex mode, the UE is configured with multiple radio stacks, wherein the first triggering condition is associated with a first threshold including that an intermodulation interference reaches the first threshold and a transmitting power of the apparatus reaches a second threshold;

receiving a second signaling message from the UE in response to detection of a second triggering condition of a need to, resume a full duplex mode of operation and reallocate radio resources accordingly, wherein the second triggering condition comprises the intermodulation interference decreasing to a third threshold that is lower than the first threshold, and the transmitting power of the apparatus decreasing to a fourth threshold that is lower than the second threshold; and adjusting the scheduling of the UE in response to receiving the signaling message.

10. The method of claim 9 wherein the first signaling message comprises an indication of at least one pair of frequencies $f_1$ and $f_2$ so that the base station avoids receiving on one of the frequencies $f_1$ and $f_2$ and transmitting on the other frequency simultaneously.

11. The method of claim 9 wherein adjusting resource allocation for the UE comprises changing at least one a downlink resource allocation and an uplink resource allocation in response to the UE switching to the half-duplex mode.

12. The method of claim 9 further comprising entering the half-duplex mode of operations by performing at least one of:

avoiding transmitting to the UE on a down link while receiving from the UE on an uplink simultaneously; and avoiding receiving from the UE on the uplink while transmitting to the UE on the downlink simultaneously.

13. The method of claim 9 further comprising receiving the second signaling message indicating the absence of a need to restrict scheduling of the UE.

14. The method of claim 9 wherein the UE is configured to support at least a long term evolution (LTE) radio stack and a wireless local area network (WLAN) radio stack.

15. A system, comprising:

a user equipment (UE) configured to upon detecting a first triggering condition, recognize a need to, on at least one pair of carrier frequencies, avoid transmitting on one of the frequencies when receiving on the other; and signal an associated base station an indication of the recognized need; and a base station configured to receive a first signaling message from the UE, in response to detection of the first triggering condition comprising an indication of a need to, on at least one pair of carrier frequencies, avoid transmitting on one of the carrier frequencies when receiving on the other, wherein the first triggering condition is associated with a first threshold including that an intermodulation interference reaches the first threshold and a transmitting power of the apparatus reaches a second threshold;

receive a second signaling message from the UE in response to detection of a second triggering condition of a need to, resume a full duplex mode of operation and reallocate radio resources accordingly, wherein the second triggering condition comprises the intermodulation interference decreasing to a third threshold that is lower than the first threshold, and the transmitting power of the apparatus decreasing to a fourth threshold that is lower than the second threshold, and adjust scheduling of the UE in response to receiving the signaling message.

16. The system of claim 15 wherein the UE is configured to detect the first triggering condition to help recognize the need to, on at least one pair of carrier frequencies, avoid transmitting on one of the frequencies when receiving on the other, by performing at least one of:

detecting that more than one radio stack are activated at the UE simultaneously, the radio stacks sharing same frequency resources;

detecting the interference-prone bands or frequency channels are put in use by the activated radio stacks; and detecting that a transmitting power of the UE reaches a threshold level.

17. The system of claim 15 wherein the first signaling message indicates at least one pair of frequencies $f_1$ and $f_2$ so that the UE avoids receiving on one of the frequencies $f_1$ and $f_2$ and transmitting on the other frequency simultaneously.

18. The system of claim 15 wherein the UE is further configured to switch back to a full duplex mode upon detecting a second triggering condition which comprises at least one of:

one or more of multiple radio stacks are deactivated leaving at most one radio stack active;

a less interference-prone band or frequency channel is put in use in place of a previous interference-prone band or frequency channel;

a transmitting power of the UE decrease to a threshold; and wherein the base station is configured to switch back to a full duplex mode of operation upon receiving the second signaling message from the UE indicating the absence of the need for the said scheduling restriction.

* * * * *